Mar. 27, 1923.

A. T. BROWN
MOTOR VEHICLE
Filed May 24, 1922

INVENTOR.
Alexander T. Brown
BY
Parsons & Bodell
ATTORNEYS.

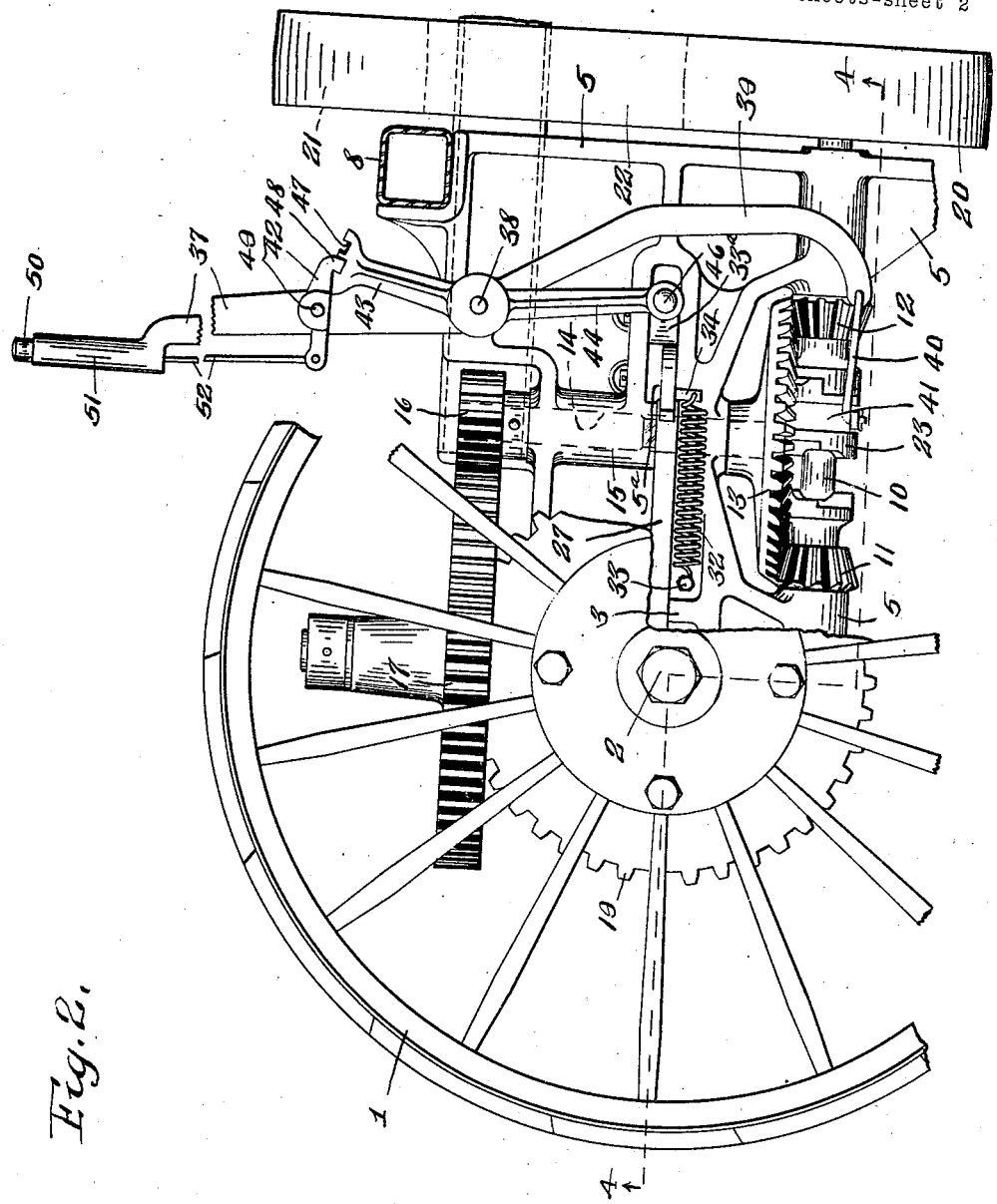

Mar. 27, 1923.
A. T. BROWN
MOTOR VEHICLE
Filed May 24, 1922
1,449,649
5 sheets-sheet 3
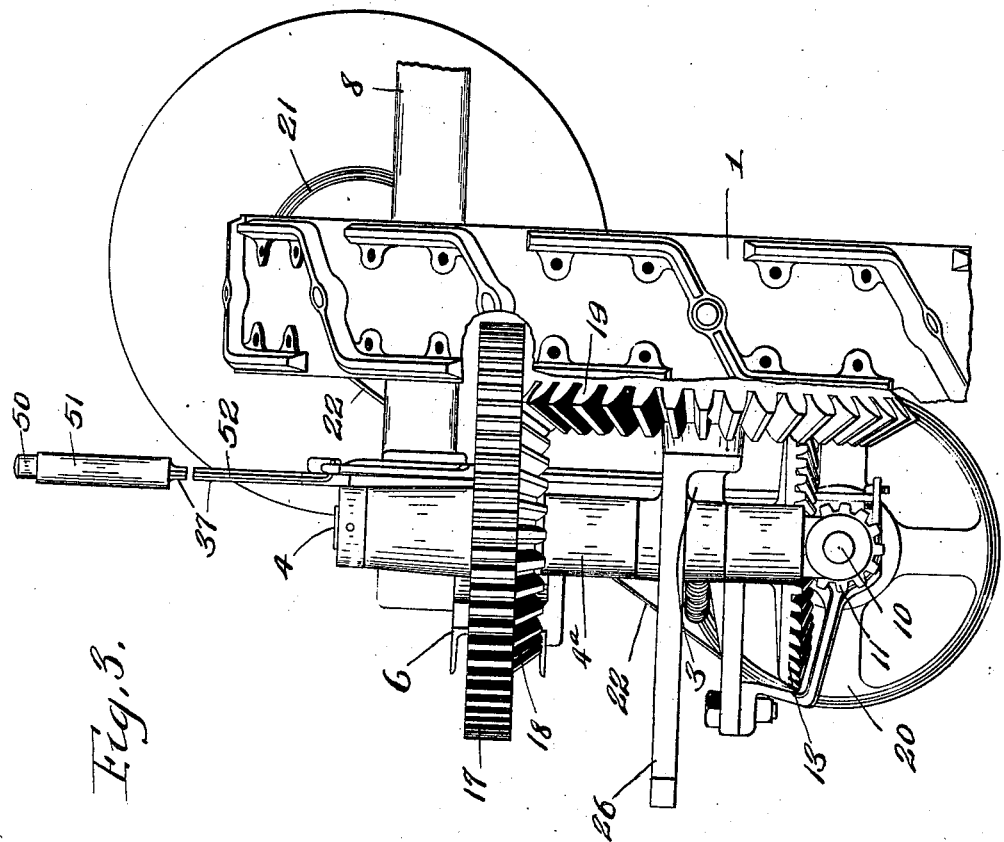

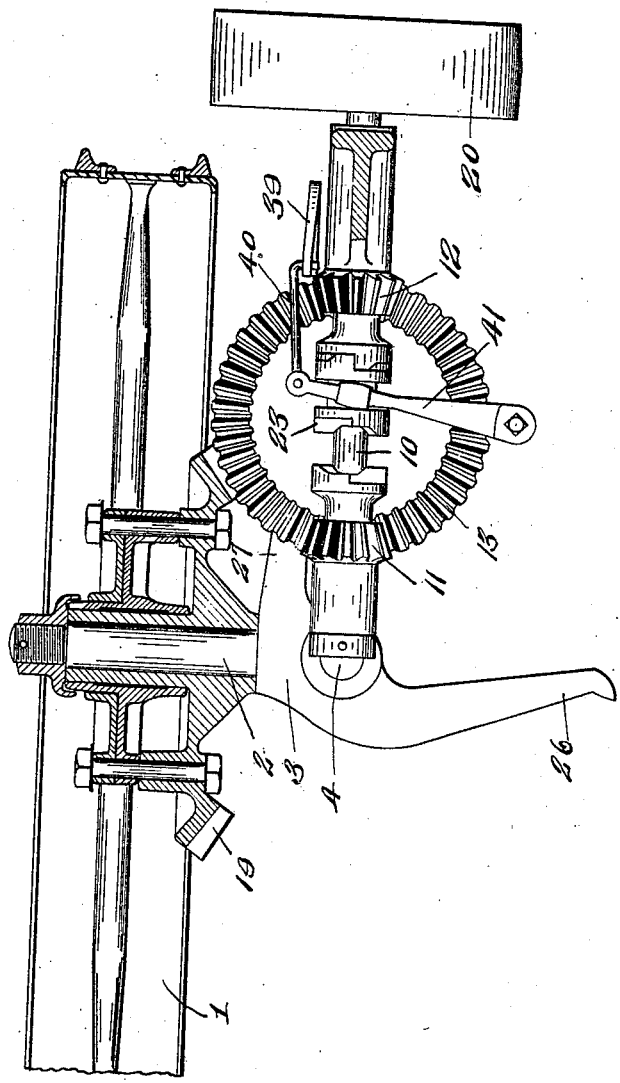

Mar. 27, 1923.

A. T. BROWN
MOTOR VEHICLE
Filed May 24, 1922

INVENTOR
Alexander T. Brown.
BY
Parsons & Bodell
ATTORNEYS.

Patented Mar. 27, 1923.

1,449,649

UNITED STATES PATENT OFFICE.

ALEXANDER T. BROWN, OF SYRACUSE, NEW YORK.

MOTOR VEHICLE.

Application filed May 24, 1922. Serial No. 563,203.

*To all whom it may concern:*

Be it known that I, ALEXANDER T. BROWN, a citizen of the United States, and a resident of Syracuse, in the county of Onondaga and State of New York, have invented a certain new and useful Motor Vehicle, of which the following is a specification.

This invention relates to motor vehicles or motor agricultural machines of the type having the combined tractor and corner turning wheel of Patent No. 1,247,073, November 20, 1917, that is, a wheel which is driven about its own axis and shiftable by power from the motor about an upright axis into different angular positions to turn corners and it has for its object a particularly simple and efficient means for controlling the direction of rotation of the tractor wheel about its own axis and also the turning thereof about its upright axis.

The invention consists in the novel features and in the combinations and constructions hereinafter set forth and claimed.

In describing this invention, reference is had to the accompanying drawings, in which like characters designate corresponding parts in all the views.

Figure 2 is an enlarged fragmentary view, partly broken away, showing in right side elevation, the mechanism for driving the tractor wheel and turning it about its upright axis and the operating means for controlling these operations.

Figure 3 is a rear elevation, parts being omitted, of parts seen in Fig. 2, the fly wheel of the engine being shown in Fig. 3.

Figure 4 is a sectional view taken approximately on line 4—4, Fig. 2, looking upwardly.

Figure 1:
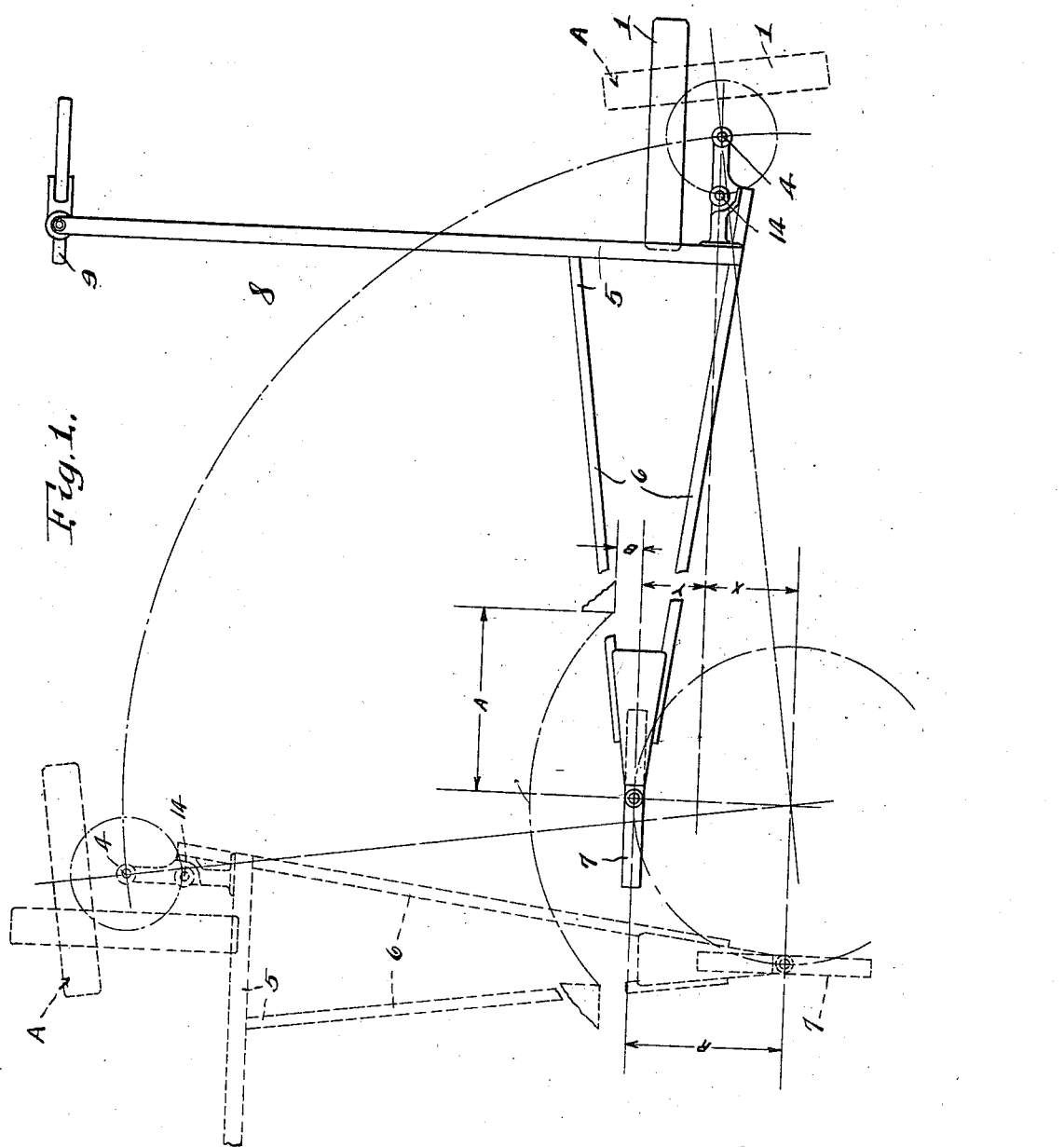
Figure 1 is a diagrammatic plan view of the machine, as a mowing machine, embodying my invention, showing the operation of the tractor wheel when turning a corner.
Figures 6, 7:
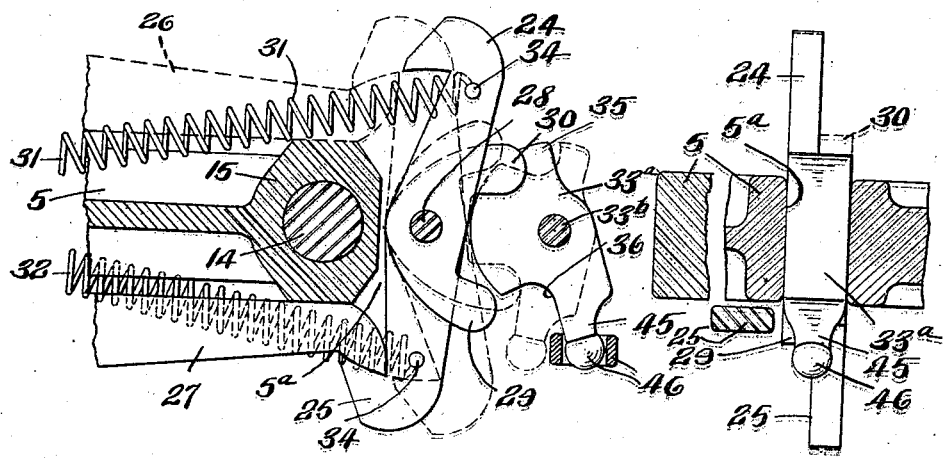
Figure 6 is a sectional view, taken on the plane of line 6—6, Fig. 5.
Figure 7 is a sectional view looking to the left in Fig. 6.
Figure 5:
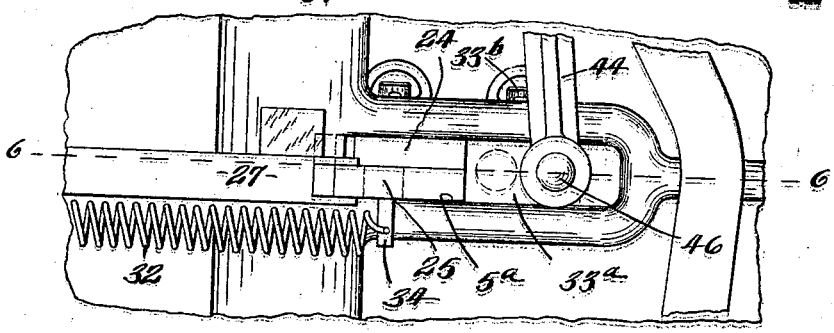
Figure 5 is an enlarged fragmentary elevation of parts seen in Fig. 2.

This motor agricultural vehicle or machine comprises, generally; a tractor, a corner turning wheel; mechanism for driving the wheel about its axis and also shifting it about an upright axis into different angular positions, said mechanism including a shiftable control member, as a clutch section by means of which the tractor wheel is connected to or disconnected from the motor and by means of which the direction of rotation of the tractor wheel can be reversed; means for holding the wheel in different angular positions about its upright axis, and, means for shifting said member or clutch section and also controlling the operation of the holding means including an operating lever common to said member and the holding means.

1 designates the tractor wheel which is mounted upon a spindle 2 carried by the bracket 3 having a vertical axle 4 journaled in the upright bearing $4^a$ in the frame 5 of the machine. The frame 5 may be of any suitable form, size and construction, and as here shown, in addition to the main body 5 includes forwardly extending frame elements 6 which are supported at their front ends by the manually operated steering wheel 7, and a laterally extending frame element 8 having a caster wheel 9 at its outer end. An implement, as the cutter bar of a mowing machine is carried by the frame element 6 in front of the frame element 8. The construction of the frame forms no part of this invention.

The mechanism for driving and turning the tractor wheel forwardly or rearwardly comprises a horizontal shaft 10 journaled in the frame 5 and extending forwardly and rearwardly thereon, pinions 11 and 12, rotatably mounted on the shaft and meshing with the gear 13 on opposite sides of the axis thereof, which gear is mounted on the vertical shaft 14 journaled in the bearing 15 in the frame 5 and carrying a gear 16 at its upper end meshing with the gear 17 mounted coaxially with the vertical axle 4 of the bracket 3, the gear 17 having a bevel gear ring 18 meshing with a bevel gear 19 associated with the wheel 1 concentric therewith. The arrangement of, and ratio between the bevel gears 18, 19 is such that when the tractor wheel is not held from swiveling the turning force of the gear 18 causes the wheel 1 to swivel.

During rotation of the shaft 10 motion is transmitted by one or the other of the gears 11 and 12 to the shaft 14 and thence through the pinion 16 and gears 17, 18 to the gear 19, thus rotating the wheel 1 about its axis 2 when the wheel is prevented from turning about its upright axis 4. The shaft 10 is provided with a pulley 20 thereon which is connected to the pulley 21 by a belt 22. An idler pulley carried by a foot lever is usually provided to engage the belt, the foot lever being operable by a spring to tighten the belt 22 so that it transmits motion to the shaft 10 and to loosen it by depressing the pedal so that the shaft 10 is idle. In fact, the idler acts as a clutch. The pulley 21 is connected to the crank shaft of the motor in any suitable manner. Said mechanism also includes a clutch section 23 slidably keyed on the shaft 10 and shiftable thereon in opposite directions from neutral position to clutch either of the gears 11 or 12 to the shaft 10.

The means for holding the tractor wheel from turning about its upright axis 4 and in any of its angular positions about such axis, as here shown, comprises a pair of latches 24, 25, extending transversely of the frame 5, through a slot 5ª therein and arranged to coact respectively with the radially extending arms 26, 27 projecting from the bracket 3, these arms being arranged nearly on a quarter with each other. The latches 24, 25 are in this embodiment of my invention, mounted upon a common vertical pivot 28 and each has an angularly extending tail 29 or 30 on the opposite side of the pivot 28 to that on which its head is located. The latches are normally moved into their operative engagement with the arms 26, 27, by means of springs 31, 32, arranged on opposite sides of the frame, each being connected at one end at 33 to the frame and at its other end to the depending pin 34 of the companion latch 24 or 25.

When the tractor wheel is straight, that is, parallel to the line of travel, whereby the machine travels in a straight line, the radial arm 27 is engaged with the latch 25 and the radial arm 27 abuts against the right hand side of the frame, or the outer side of the bearing 15 for the shaft 14 which bearing is integral with the frame 5. When the tractor wheel is turned about its upright axis 4 into the angular position A, Fig. 1, the arm 26 is engaged with the latch 24, it of course, being necessary to disengage the latch 25 from the arm 27 before the tractor wheel can assume its angular position.

The mechanism for shifting the latches operates to permit one latch to be moved into engagement with its companion arm 26 or 27 and move the other latch about its pivot 28 out of engagement with its companion arm. As here illustrated, this means includes a cam member 33ª mounted in the transverse slot 5ª in the frame 5, the cam 33ª being mounted upon a vertical pivot 33ᵇ and coacting with the tails 29 and 30, of the pawls 24 and 25. Said member is also provided with stops 35 and 36 which engage the ends of the tails 30 and 29, and hence limit the pivotal movement of the cam 33ª.

The means for shifting the clutch section or member 23 and the cam member 33ª comprises a hand lever 37 common to both of said members 23 and 33ª and connections between the hand lever and said members respectively, the connections between the hand lever 37 and the clutch section 23 being permanent and those between the hand lever 37 and the member 33ª being disconnectible at will whereby when desired, the clutch section can be shifted to reverse the direction of rotation of the tractor wheel without operating the latches 24 and 25. The lever 37 is mounted suitably on the frame and may be mounted upon a suitable stud or shaft 38 on the frame 5 and is permanently connected to the clutch section 23 by means of a lever arm 39 rigid therewith and a link 40 connecting the lower end of the lever arm to the fork or shifter 41 coacting with the clutch section 23. The lever 37 is connected to the cam member 33ª by means of a latch or coupling 42 coacting with a lever 43 mounted coaxially with the lever 37 and usually on the stud 38 and having an arm 44 connected to the laterally extending arm 45 of the cam member 33ª here shown as by a ball and socket joint 46. The latch 42 is for greater convenience mounted on the lever 37 and the lever 43 is provided at its upper end with one or more notches 47 with which the tooth 48 of the latch coacts. Said latch is preferably pivoted at 49 to one side of the lever 37 and is operable by means of a plunger or button 50 extending axially through the handle 51 of the lever 37 and connected to the tail of the latch 42 by a rod 52. The movement downwardly of the plunger or button is against the action of a suitable spring located on the handle 51.

In operation, the machine is normally driven in a straight line along one side of the uncut crop and when a corner is reached, it is necessary to shift the tractor wheel into the position A, Fig. 1. The lever 37 is then pushed forwardly, shifting the clutch 23 out of engagement with the pinion 12 and into engagement with the pinion 11. Hence, during the operation of the lever 37 to shift the clutch section 23 the cam member 33ª is operated to shift the latch 25 out of engagement with the arm 27 and as the tractor wheel will now be rotated in a reverse direction and as it is not held from turning about its upright axis 4 it will turn or swivel about its upright axis until the arm 26 hits the frame at 15 and latches, whereupon it now being held from movement about its upright axis 4 and being in angular position, will travel over the ground, causing the machine to swing about an upright axis near the front end of the machine, swinging the machine from the position, shown in dotted lines in Fig. 1 into the position shown in full lines. The machine is now in position to cut a swath along another side of the standing crop, but the tractor wheel is in its angular position A. Now, upon rearward movement of the lever 37 the clutch section 23 will be again shifted into engagement with the forward driving pinion 12, the latch 24 released from the arm 26 and the latch 25 moved into position to latch into engagement with the arm 27; hence during the forward rotation of the wheel 1 it will first move from its angular position A into its straight position and thereupon drive the machine forwardly in a straight line. However, if in first turning, the operator should permit the machine to swing too far, so that it is necessary to swing the machine in the reverse direction before going straight ahead, he can shift the clutch section 23 into engagement with the forward driving pinion 12 without releasing the latch 24 from the arm 26 by pressing on the plunger or button 50 and withdrawing the latch 42 out of engagement out of one of the notches 47 of the arm 43, and when the machine is properly positioned, he can again shift the lever 37 to permit the latch 42 to drop into one of the notches 47 and again operate it to shift the clutch section into engagement with the forward driving pinion 12 and at the same time operate the cam 33ª to release the latch 24 from the arm 26 and move the latch 25 into position to engage the arm 27 when the tractor wheel swings around into straight position. Also, in some instances, it is desirable to back up in a straight line without disturbing the latches and in such instances, this can be done by withdrawing the latch 42 out of engagement with the arm 43 before shifting the lever 37 to shift the clutch section 23. However, in the normal operation, both the clutch section 23 and the cam member 33ª are shifted in one operation on the lever 37. It is not necessary to release the lever 37 from the cam 33ª in manœuvring to correctly position the machine to take the next cut. Two notches 47 are shown arranged to receive the latch 42, when the lever 37 is operated to shift the clutch section 23 from forward or rearward driving position without operating the latches 24, 25. One notch is for the neutral position of the clutch section 23, the springs 32, 33 holding the cam 33ª which in turn holds the levers 37 by means of the latch 42.

What I claim is:

1. In a motor vehicle, a tractor and corner turning wheel, and mechanism for driving the wheel about its axis and turning it about an upright axis into different angular positions, said mechanism including a shiftable control member, means for holding the wheel from turning about its upright axis and in its different angular positions and means for shifting said member and controlling the operation of the holding means including an operating lever common to said member and the holding means, substantially as and for the purpose described.

2. In a motor vehicle, a tractor and corner turning wheel and mechanism for driving the wheel about its axis and turning it about an upright axis into different angular positions, said mechanism including a shiftable control member, means for holding the wheel from turning about its upright axis and holding it in different angular positions including a shiftable holding member, an operating lever and connections between said lever and both of said members, substantially as and for the purpose specified.

3. In a motor vehicle, a tractor and corner turning wheel and mechanism for driving the wheel about its axis and turning it about an upright axis into different angular positions, said mechanism including a shiftable control member, means for holding the wheel from turning about its upright axis and holding it in different angular positions including a shiftable holding member, an operating lever common to both members and means for disconnecting the lever at will from one of said members, substantially as and for the purpose set forth.

4. In a motor vehicle, a tractor and corner turning wheel and mechanism for driving the wheel about its axis and turning it about an upright axis into different angular positions, said mechanism including a shiftable control member, means for holding the wheel from turning about its upright axis and holding it in different angular positions including a shiftable holding member, an operating lever common to both members and means for disconnecting the lever at will from the shiftable member in the holding means, substantially as and for the purpose described.

5. In a motor vehicle, a traction and turning wheel and mechanism for driving the wheel about its axis and turning it about an upright axis into different angular positions, said mechanism including a shiftable control member, means for holding the wheel in different angular positions including a shiftable holding member, motion transmitting elements connected to said members, respectively, an operating lever connected to one of said elements, and a lock and operating means therefor, carried by the lever and normally locking the lever to the other of said elements, substantially as and for the purpose specified.

6. In a motor vehicle, a tractor and corner turning wheel and mechanism for driving the wheel about its axis and turning it about an upright axis into different angular positions, said mechanism including a shiftable control member, means for holding the wheel from turning about its upright axis and holding it in different angular positions including a shiftable holding member, lever elements mounted side by side on the common axis and connected to said members respectively and a hand lever common to both of said elements and movable about said common axis and permanently connected to one of said elements and a lock and operating means therefor carried by said lever and coacting with the other of said elements, substantially as and for the purpose set forth.

7. In a motor vehicle, a tractor and corner turning wheel and mechanism for driving the wheel about its axis and turning it about its upright axis into different angular positions, said mechanism including a clutch section shiftable from neutral position to control the driving or the tractor wheel forwardly or backwardly, means for holding the wheel in different angular positions including a pair of arms radial with the upright axis of the wheel and movable with the wheel about such upright axis, latches coacting alternately with said arms to hold the wheel from turning, a shiftable member coacting with the latches to shift the same into and out of operative position, an operating lever permanently connected to the clutch section, and a lock carried by the operating lever and operable to connect and disconnect the operating lever at will to and from the shiftable control member for the latches.

8. In a motor vehicle, a tractor wheel mounted to swivel about an upright axis, mechanism for driving the wheel and for turning it about its upright axis comprising and controlling the operation of the holding axis, and a driven gear concentric with the axis of the tractor wheel and meshing with the former gear and tending to swivel the tractor wheel about its upright axis, and means operable to permit the swiveling of the tractor wheel and to limit the swiveling movement in different radial positions relatively to the upright axis, said means including latches one of which normally holds the tractor wheel from swivelling, and the other of which is out of holding position, and means for operating the latches to move the latch in holding position out of holding position and the latch formerly out of holding position into holding position, substantially as and for the purpose specified.

9. In a motor vehicle, a tractor wheel mounted to swivel about an upright axis, mechanism for driving the wheel and for turning it about its upright axis and means operable to permit swivelling of the tractor wheel and to limit the swivelling movement in different swivelling positions relatively to the upright axis, said means including latches, one of which normally holds the tractor wheel from swivelling and the other of which is out of holding position, and means for operating the latches to move the latch in holding position out of holding position and the latch formerly out of holding position into holding position, substantially as and for the purpose set forth.

In testimony whereof, I have hereunto signed my name, at Syracuse, in the county of Onondaga, and State of New York, this 12th day of May, 1922.

ALEXANDER T. BROWN.

Certificate of Correction.

It is hereby certified that in Letters Patent No. 1,449,649, granted March 27, 1923, upon the application of Alexander T. Brown, of Syracuse, New York, for an improvement in "Motor Vehicles," an error appears in the printed specification requiring correction as follows: Page 4, lines 39 and 40, claim 8, strike out the words "and controlling the operation of the holding axis" and insert instead *a driving gear concentric with said upright axis;* and that the said Letters Patent should be read with this correction therein that the same may conform to the record of the case in the Patent Office.

Signed and sealed this 19th day of June, A. D., 1923.

[SEAL.]
WM. A. KINNAN,
*Acting Commissioner of Patents.*